United States Patent
Cmelik et al.

(10) Patent No.: US 6,820,216 B2
(45) Date of Patent: Nov. 16, 2004

(54) METHOD AND APPARATUS FOR ACCELERATING FAULT HANDLING

(75) Inventors: Robert Cmelik, Sunnyvale, CA (US); Malcolm Wing, Menlo Park, CA (US)

(73) Assignee: Transmeta Corporation, Santa Clara, CA (US)

( * ) Notice: Subject to any disclaimer, the term of this patent is extended or adjusted under 35 U.S.C. 154(b) by 456 days.

(21) Appl. No.: 09/822,929

(22) Filed: Mar. 30, 2001

(65) Prior Publication Data

US 2002/0144179 A1 Oct. 3, 2002

(51) Int. Cl.$^7$ .................................................. G06F 11/00
(52) U.S. Cl. ........................................... 714/15; 714/16
(58) Field of Search ............................ 714/15, 16, 17, 714/18, 21

(56) References Cited

U.S. PATENT DOCUMENTS

| | | | | | |
|---|---|---|---|---|---|
| 3,736,566 A | * | 5/1973 | Anderson et al. | ............. | 714/15 |
| 4,740,969 A | * | 4/1988 | Fremont | ..................... | 714/15 |
| 5,043,866 A | * | 8/1991 | Myre et al. | .................. | 707/202 |
| 5,524,205 A | * | 6/1996 | Lomet et al. | .................. | 714/16 |
| 5,958,061 A | * | 9/1999 | Kelly et al. | ..................... | 714/1 |
| 5,974,425 A | * | 10/1999 | Obermarck et al. | ........ | 707/202 |
| 6,011,908 A | * | 1/2000 | Wing et al. | .................... | 714/19 |
| 6,105,148 A | * | 8/2000 | Chung et al. | .................. | 714/16 |
| 6,185,702 B1 | * | 2/2001 | Shirakihara et al. | .......... | 714/38 |
| 6,480,944 B2 | * | 11/2002 | Bradshaw et al. | .......... | 711/162 |
| 6,662,311 B2 | * | 12/2003 | Itoh et al. | ..................... | 714/15 |
| 2002/0032883 A1 | * | 3/2002 | Kampe et al. | ................ | 714/16 |

OTHER PUBLICATIONS

Tanenbaum, Andrew Structured Computer Organization ($2^{nd}$ Edition 1984) excerpt.*

* cited by examiner

Primary Examiner—Robert Beausoliel
Assistant Examiner—Bryce P. Bonzo

(57) ABSTRACT

A process which stores an indication of a next instruction in a sequence of instructions which is to be executed whenever during execution of instructions of the sequence it is apparent that state of the process is consistent, and refers to the stored indication to determine an instruction at which to begin re-execution of the sequence after executing a fault handler initiated by an interrupt to the sequence.

10 Claims, 3 Drawing Sheets

METHOD AND APPARATUS FOR ACCELERATING FAULT HANDLING

BACKGROUND OF THE INVENTION

1. Field of the Invention

This invention relates to computer systems and, more particularly, to a method and apparatus by which a computer processor may accelerate fault handling.

2. History of the Prior Art

A computer processor continually encounters circumstances in which it must halt the processing of a particular sequence of instructions to attend to some occurrence not usually encountered in the sequence. These occurrences are variously referred to as errors, exceptions, faults, and other terms which are often defined differently by different parties and under different circumstances. In general, such occurrences all require the processor to halt the sequence of instructions it is presently processing and take some action outside of the execution of the interrupted sequence.

As one example, an error in executing a particular sequence may require that the processor stop the execution, discard the results generated to that point, and move back to an earlier point in the sequence to begin reexecution. On the other hand, an interrupt may be generated by a modem signaling that data is arriving from circuitry external to the computer that is executing the sequence. Such an interrupt may require the processor to stop execution of the sequence, receive the externally-provided data, and then return to executing the sequence at the point at which it was stopped. There are many other situations in which a processor must halt its processing in order to attend to matters outside of the execution of an executing sequence, and all are subject to a number of the same difficulties. Because there are many different situations, in this specification, the use of each of the terms fault, exception, error, and the like is intended to encompass all of these terms except where otherwise stated or made obvious from the text.

The typical method of handling exceptions is to interrupt the sequence of instructions being executed, save enough information about the sequence and its execution up to its interruption to be able to return to the sequence and continue its execution, then transfer control of the processor to a software sequence of instructions for handling the exception (usually referred to as an exception handler), execute the exception handler to handle whatever needs be done to take care of the exception, retrieve the information about the interrupted sequence and its execution up to its interruption, and recommence execution of the interrupted sequence of instructions. Of course, in many situations, the exception will be such that the interrupted sequence cannot or should not continue so that the processor will be directed to some other sequence of instructions by the handler.

In those situations in which the proper action for the processor is to return to the interrupted sequence and continue its execution, it is necessary for the processor to understand at what point the interruption occurred so that execution may recommence at the proper point in the sequence.

In many situations, even though a typical processor will have stored information sufficient to be able return to the point of interruption, it may not know the exact point in the sequence to which it should return and will have to compute this point. For example, when a process is interrupted in order to allow another process to execute, then it is necessary for the interrupt to take effect at a point at which consistent state exists. However, a processor executing a speculative sequence of instructions will probably not commit to memory information generated by the speculative sequence until the sequence is determined to be the proper sequence for execution and has executed without error. Thus, if execution of a speculative sequence is interrupted, the interrupt may not occur at a point at which consistent state exists because information from the interrupted sequence has not yet been stored. Thus, the point at which the sequence is actually interrupted might not be a point at which consistent state exists and at which a new sequence may begin. Although the processor knows where the interrupt occurred, the processor may have insufficient information to immediately return to a point at which consistent state exists. In such a case it is necessary for the processor to use what data it has to determine a correct point to recommence execution. A significant amount of time and storage is often required to accomplish this determination, especially where subroutines are involved in the interrupted sequence.

It is desirable to provide circuitry and processes by which a processor may determine a point to recommence execution of an interrupted sequence of instructions more quickly than by using prior art techniques.

SUMMARY OF THE INVENTION

It is, therefore, an object of the present invention to enhance the operation of a microprocessor by providing improved methods and circuitry for accomplishing fault handling.

This and other objects of the present invention are realized by a process which stores an indication of a next instruction in a sequence of instructions which is to be executed whenever during execution of instructions of the sequence it is apparent that state of the process is consistent, and refers to the stored indication to determine an instruction to which to return from handling a fault.

These and other objects and features of the invention will be better understood by reference to the detailed description which follows taken together with the drawings in which like elements are referred to by like designations throughout the several views.

DETAILED DESCRIPTION

Figure 1:
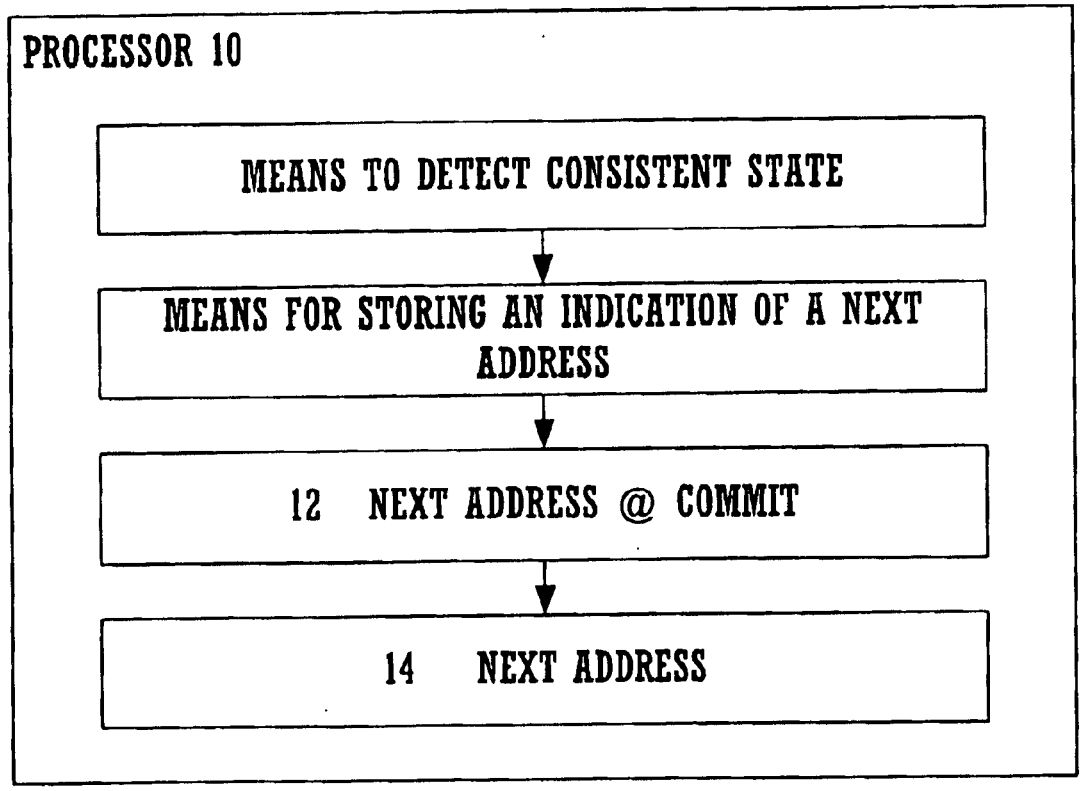
FIG. 1 is a diagram illustrating circuit elements utilized by the methods of FIGS. 2 and 3.
Figure 2:
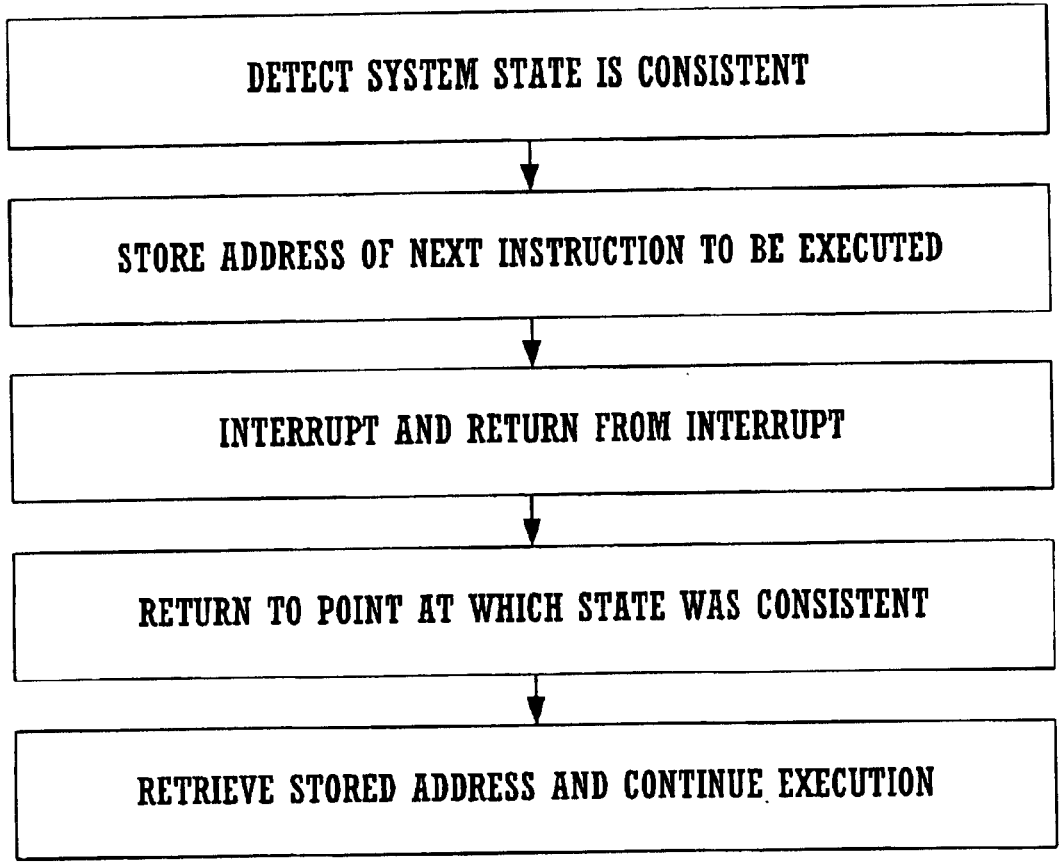
FIG. 2 is a flow chart illustrating a general method in accordance with the invention.
Figure 3:
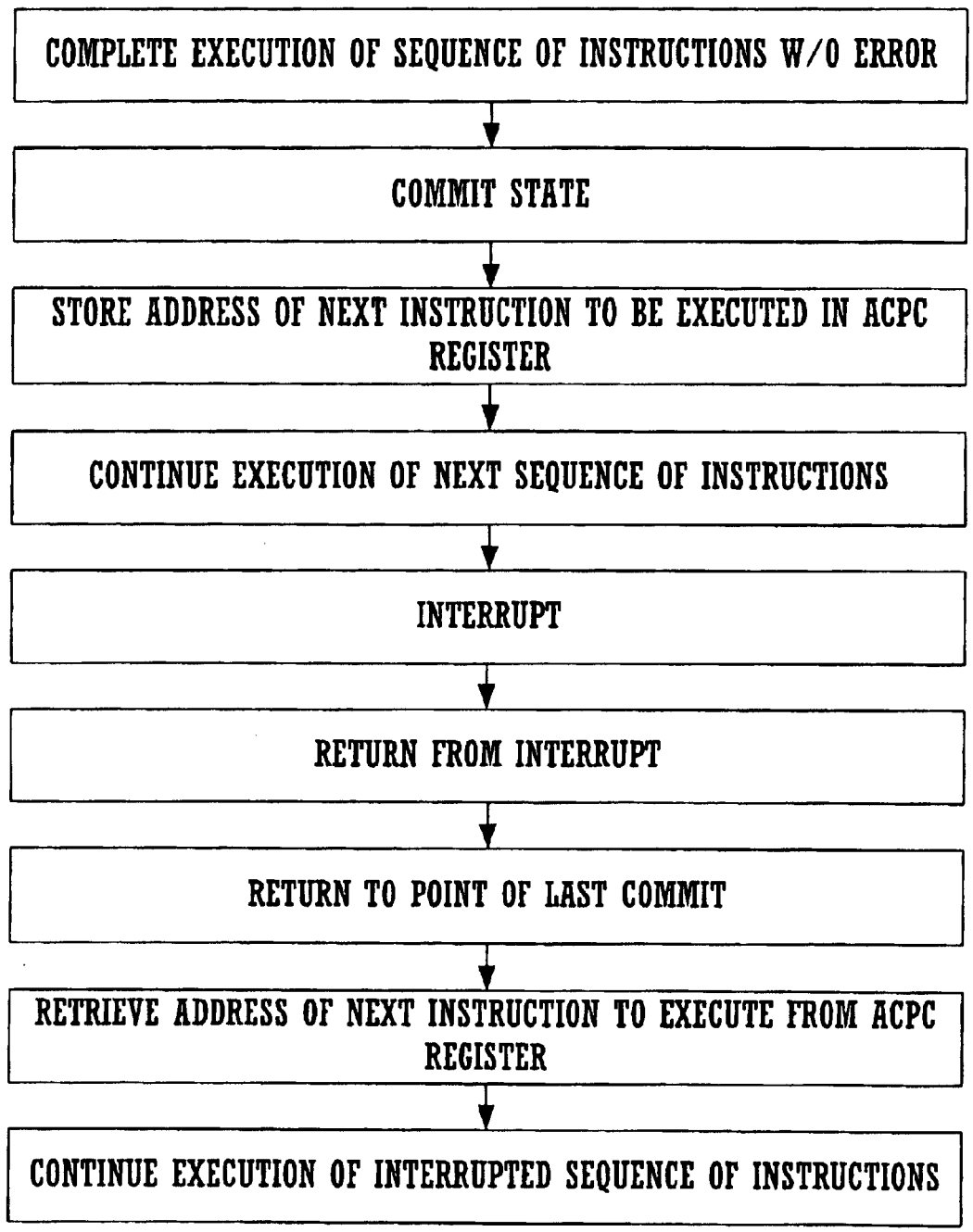
FIG. 3 is a flow chart illustrating a particular method in accordance with the invention.

The present invention is illustrated in FIG. 1. The invention includes a processor 10 that utilizes a register 12 (or other storage media) to record the address of the next instruction that is designated to be executed whenever the operating system has determined that state of the system is consistent. By recording the address of the next instruction in line to be executed at a point at which state becomes consistent, the proper point for resuming execution of a sequence of instructions which is later interrupted can be determined without computation by simply reading the address from the register 12. If the sequence which is interrupted is a speculative sequence for which system state is not consistent at the point at which the sequence is interrupted, then moving back to a point at which system state was consistent and referring to the instruction at the address held by the register 12 allows the interrupted sequence to be resumed expeditiously at the proper point without computing this point from the address held in a program counter 14 at the point of the interrupt.

The present invention is especially useful when utilized with a new processor designed by Transmeta Corporation of Santa Clara, Calif. The new microprocessor combines a simple but fast host processor (called a "morph host") and software (referred to as "code morphing software") to execute application programs designed for a processor (the "target processor") having an instruction set different than the morph host processor. The morph host processor executes the code morphing software which translates the target programs dynamically into morph host processor instructions able to accomplish the purpose of the original target software. As the target instructions are translated, the new host instructions are both executed and stored in a translation buffer where they may be accessed without further translation. Although the initial translation of a program is slow, once translated, many of the steps normally required by prior art hardware to execute a program are eliminated.

In order to be able to execute programs designed for other processors at a rapid rate, the morph host processor includes a number of hardware enhancements. One of these enhancements is a gated store buffer which holds memory stores generated as sequences of morph host instructions are executed. A second enhancement is a set of host registers which store state of the target processor at the beginning of any sequence of target instructions being translated. If the translated morph host instructions execute without raising an exception, the target state at the beginning of the sequence of instructions is updated to the target state at the point at which the sequence completed and the memory stores are committed to memory.

If an exception occurs during the execution of the sequence of host instructions which have been translated, processing stops; and the entire operation may be returned or rolled back to the beginning of the sequence of target instructions at which known consistent state of the target processor exists. This allows very rapid and accurate handling of exceptions while dynamically translating and executing instructions. The new processor is described in detail in U.S. Pat. No. 6,031,992; Cmelik et al.

Since the new processor is continuously updating system state to be consistent after executing sequences of instructions, it is quite simple for this processor to store the address of the next instruction which is to be executed in the register 11 at the point at which state is brought up to date (or "committed" in the terms of the above-mentioned patent). In order to accomplish this, the system software causes the processor to respond to a "commit" instruction by storing the address of the next instruction following the commit in the register 12. Normally, such an instruction merely follows in the sequence. However, in one embodiment, if the next instruction is a branch instruction, then the address of the target of the branch instruction is stored in the register 12.

The invention allows the above-described processor to handle faults at any point during sequences of instructions without first determining whether state is consistent at the point of the interrupt. Even though a fault happens at a time when state is inconsistent, after the fault handler completes, the software provides an immediate rollback to a consistent point. Thus, even though state is inconsistent at the point of the interrupt and the address held by the processor program counter 14 where the interrupt occurred points to the wrong address for recommencing execution of the interrupted sequence, after the rollback, state has become consistent and the address stored in the register 12 whenever a commit occurs is the address at which the processor should start the interrupted program after the interrupt has been handled.

This ability to immediately determine the correct address of the next instruction upon a return from interrupt accelerates execution of fault handling processes and processor speed. For example, this ability is especially useful in handling direct memory access operations initiated by sources outside the particular computer. Since such accesses are safe only where system state is consistent, the ability to guarantee consistent system state after each interrupt and an immediate return address following the interrupt are quite valuable.

Although the invention is especially useful when used with the above-described processor, it would appear that any processor (or processor and software) which affirmatively determines or recognizes that system state is consistent might utilize the invention to accelerate the handling of faults in a manner within the scope of this invention. It should be noted that although the above-described processor typically utilizes software to make the determination that state is consistent, other means such as hardware means can be utilized to accomplish the same purpose. Similarly, although the above-described processor typically utilizes software to store the address of the next instruction which is to be executed in the register 11 at the point at which state is brought up to date, other means such as hardware means can be utilized to accomplish the same purpose. The process of this invention is much easier and faster than trying to go back through the translation to determine the proper point to restart.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for accelerating the handling of faults by a computer processor comprising the steps of:

translating target processor instructions into a sequence of instructions;

executing said sequence of instructions;

storing an indication of a next instruction in said sequence of instructions which is to be executed whenever during execution of instructions of a sequence it is apparent that state of process is consistent, wherein said indication is stored in response to a commit instruction, and referring to the stored indication to determine an instruction at which to begin re-execution of the sequence after executing a fault handler initiated by an interrupt to the sequence.

2. A method as claimed in claim 1 further comprising the step of detecting when state of the process is consistent.

3. A method as claimed in claim 1 in which the step of storing an indication of a next instruction in a sequence of instructions which is to be executed whenever during execution of instructions of the sequence it is apparent that state of the process is consistent is accomplished by a software process executing on the computer processor.

4. A method as claimed in claim 1 in which the step of referring to the stored indication to determine an instruction at which to begin re-execution of the sequence after executing a fault handler initiated by an interrupt to the sequence is accomplished by a software process executing on the computer processor.

5. A processor comprising a first storage media for retaining an indication of a next instruction in a sequence of instructions, wherein said sequence of instructions include translated target processor instructions, and a second storage media for retaining an indication of a next instruction to be executed whenever state of the processor becomes consistent, wherein said indication is stored in response to a commit instruction.

6. A processor as claimed in claim 5 further comprising means for detecting consistency of state of a processor, and means for storing an indication of a next instruction to be executed in the second storage media whenever state of the processor becomes consistent.

7. A processor as claimed in claim 6 in which the means for detecting consistency of state of a processor includes software executing on the processor.

8. A processor as claimed in claim 6 in which the means for storing an indication of a next instruction to be executed in the second storage media whenever state of the processor becomes consistent includes software executing on the processor.

9. A processor as claimed in claim 6 in which the means for detecting consistency of state of a processor includes hardware circuitry.

10. A processor as claimed in claim 6 in which the means for storing an indication of a next instruction to be executed in the second storage media whenever state of the processor becomes consistent includes hardware circuitry.

* * * * *